United States Patent [19]

Hojabr

[11] Patent Number: 5,618,881
[45] Date of Patent: Apr. 8, 1997

[54] COMPATIBILIZER COMPOSITION

[75] Inventor: Sassan Hojabr, Kingston, Canada

[73] Assignee: Du Pont Canada Inc., Mississauga, Canada

[21] Appl. No.: 370,061

[22] Filed: Jan. 9, 1995

[51] Int. Cl.⁶ .............. C08L 23/04; C08L 67/02
[52] U.S. Cl. .............................. 525/64; 525/166
[58] Field of Search .................................. 525/64

[56] References Cited

U.S. PATENT DOCUMENTS

| | | | |
|---|---|---|---|
| 4,753,980 | 6/1988 | Deyrup | 525/176 |
| 5,093,404 | 3/1992 | Okada | 525/64 |
| 5,095,063 | 3/1992 | Okada | 525/64 |

FOREIGN PATENT DOCUMENTS

| | | | |
|---|---|---|---|
| 0177151 | 4/1986 | European Pat. Off. | 525/64 |
| 02276841 | 11/1990 | Japan | B41M 5/40 |
| 5-43766 | 8/1991 | Japan | C08L 33/14 |

OTHER PUBLICATIONS

T. D. Traugott, J. W. Barlow, D. R. Paul, Mechanical Compatibilization of High Density Polyethylene–Poly(ethylene Terephthalate) Blends, *Journal of Applied Polymer Science*, 28, 2947–2959, 1983.

*Primary Examiner*—Patricia A. Short

[57] ABSTRACT

This invention relates to a composition to improve the mechanical properties of blends of polyolefins and polyesters and particularly relates to compatibilizers for polyethylene and polyester blends and the method relating to their production. One particular embodiment of the compatibilizers is a polyolefin with a grafted monomer such as Polyethylene grafted with maleic anhydride and a terpolymer of ethylene such as ethylene, n-Butyl Acrylate and glycidyl methacrylate.

9 Claims, 5 Drawing Sheets

Control: RHDPE/RPET (75/25)

RHDPE/RPET (75/25) & Fusabond/Elvaloy (5/2 pph)

COMPATIBILIZER COMPOSITION

FIELD OF INVENTION

This invention relates to compositions to improve the mechanical properties of blends of polyolefins and polyesters and particularly relates to compatibilizers for polyethylene and polyester blends, and the method relating to same.

BACKGROUND OF THE INVENTION

The blending of two of more polymers has attracted wide interest for a variety of reasons including the development of new "polymer alloys", new products, as well as the desire to recycle post-consumer plastic waste materials.

One of the technical difficulties with recycling of post-consumer plastic waste materials is the incompatibility of the different polymer materials found in plastic waste streams such as polypropylene, polyethylene, polystyrene, polyvinylchloride (PVC), polyesters, polyamides and others. Generally speaking blends of incompatible or thermodynamically immiscible polymers produce blends which exhibit poor mechanical properties and processing difficulties.

Moreover, post-consumer waste material is often collected as a mixture of incompatible polymer materials. One such system is polyethylene (PE) and polyethylene terephthalate (PET) which constitute a large portion of both rigid and flexible post-consumer plastic waste. These two polymers are immiscible and incompatible and therefore their blends exhibit poor mechanical properties and processing difficulties.

Although PET and PE can be physically separated due to differences in densities, the operation is capital intensive. An alternative has been the use of compatibilizing agents to lower the interfacial tension between the two phases. There have been a number of efforts in the past with different degrees of success to find such suitable compatibilizers.

For example, Traugott et al. utilized Styrene-Butadiene-Styrene (SBS) the block copolymer (sold under the trademark "Kraton") as a compatibilizing agent in blends of PET and high density polyethylene HDPE as disclosed in the Journal of Applied Polymer Science, Volume 28, p. 2947–59. A significant increase of Izod impact was reported by Traugott with the inclusion of 10% SBS's, but at the expense of tensile strength and modulus.

Japanese IP 91-228316 910813 relates to thermoplastic polyester-polyolefin molding compositions where the polyolefins are modified with unsaturated carboxylic acids or their derivatives, typically maleic anhydride and blended with copolymers of unsaturated carboxylic acid, glycidyl esters, typically glycidyl (meth) acrylate and other monomers.

Furthermore, Japanese J02276841, JP 02-276841 relates to an orientated film suitable as synthetic paper for blending a polyolefin resin with thermoplastic polyester and maleic anhydride modified or glycidyl methacrylate modified polyolefin resin.

Moreover U.S. Pat. No. 4,753,980 relates to toughened thermoplastic polyester compositions comprising polyester matrixing resin and ethylene copolymer such as ethylene/methylacrylate/glycidyl methacrylate.

It is an object of this invention to provide an improved composition for blending polyolefins and polyesters having improved mechanical properties.

The broadest aspect of this invention relates to the provision of a compatibilizer composition comprising a grafted polymer grafted with at least one monomer selected from ethylenically unsaturated dicarboxylic acids and anhydrides thereof, and derivatives thereof. One embodiment of the invention utilizes polyethylene grafted with maleic anhydride (PE-g-MAH) and ethylene, n-Butyl Acrylate glycidyl methacrylate (EnBAGMA).

Another aspect of this invention comprises blending polyolefins and polyesters with PE-g-MAH and EnBAGMA.

DESCRIPTION OF THE DRAWINGS

These and other features of the invention shall be described in relation to the drawings.

DESCRIPTION OF INVENTION

Figure 1:
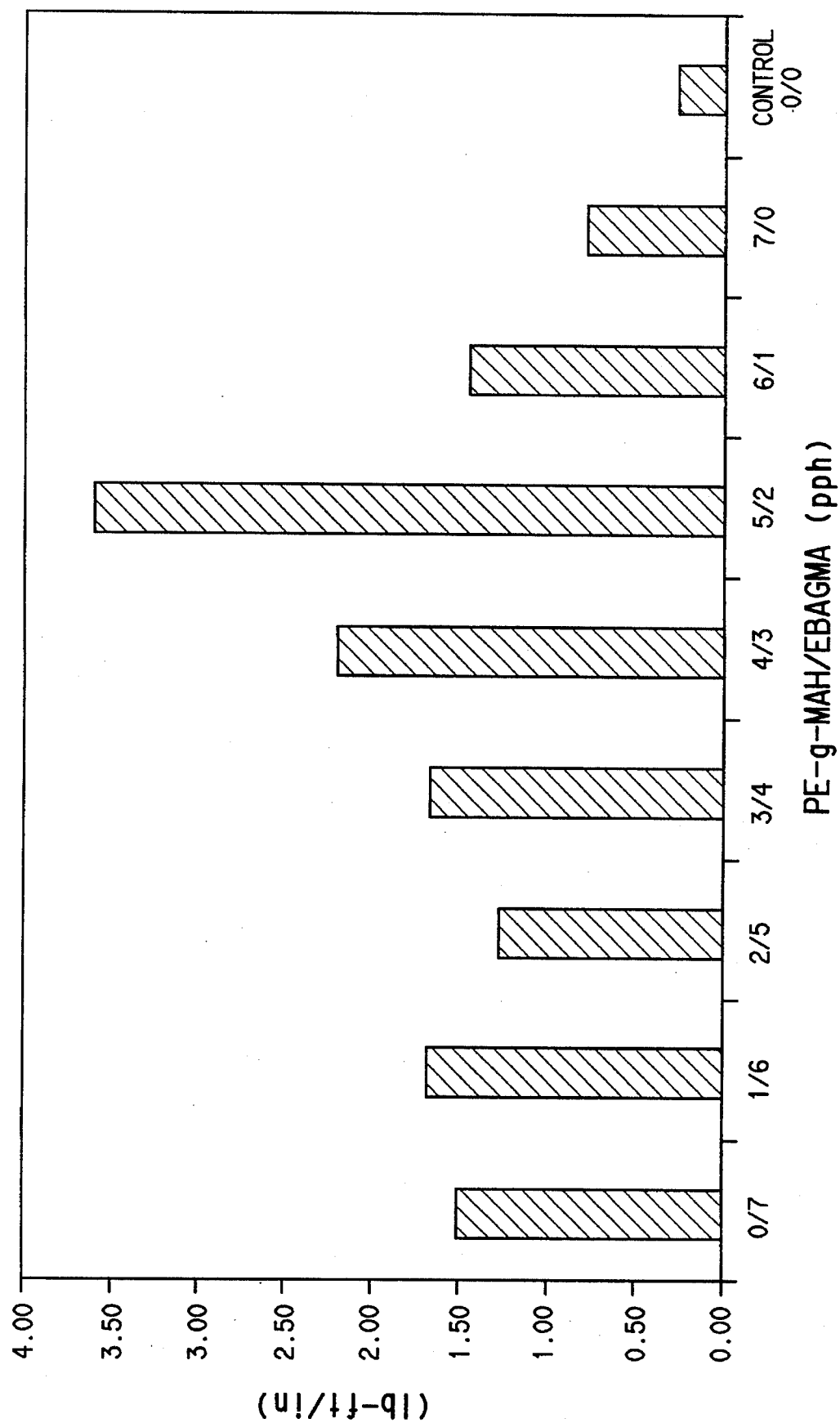
FIG. 1 is a chart showing Notched Izod Impact Strength.
Figure 2:
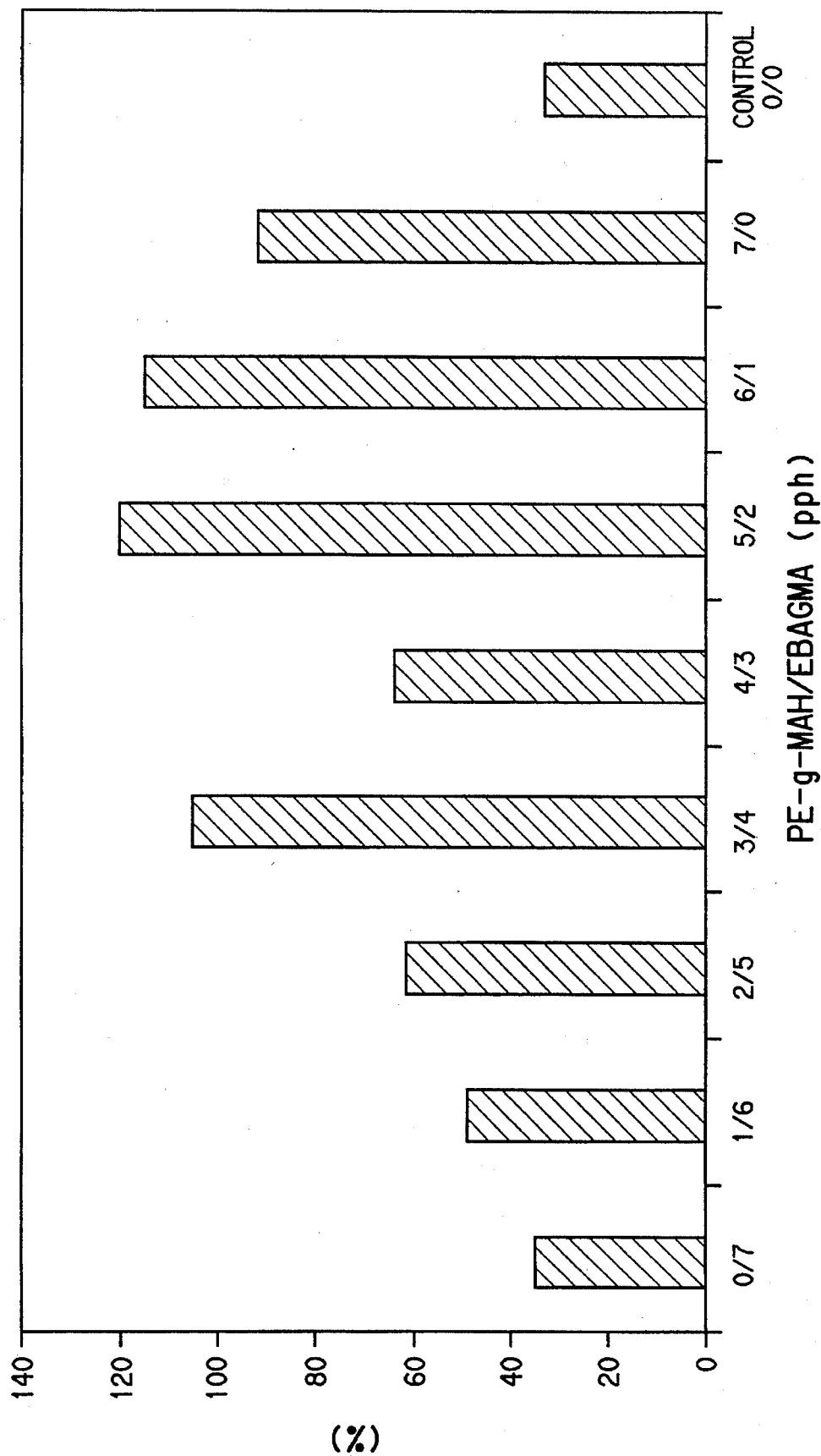
FIG. 2 is a chart showing Elongation at Break.
Figure 3:
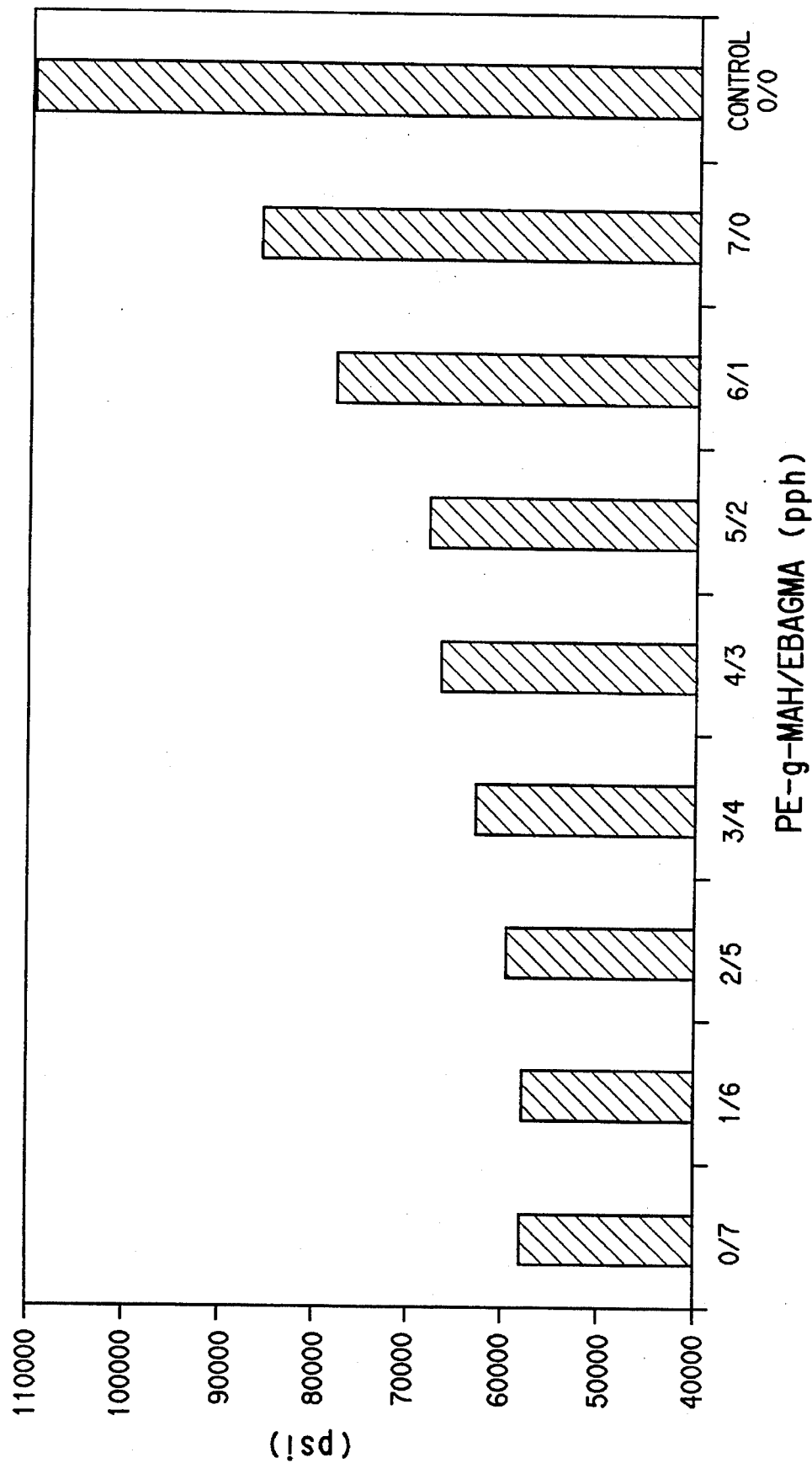
FIG. 3 is a chart showing Flexural Modulus.
Figure 4:
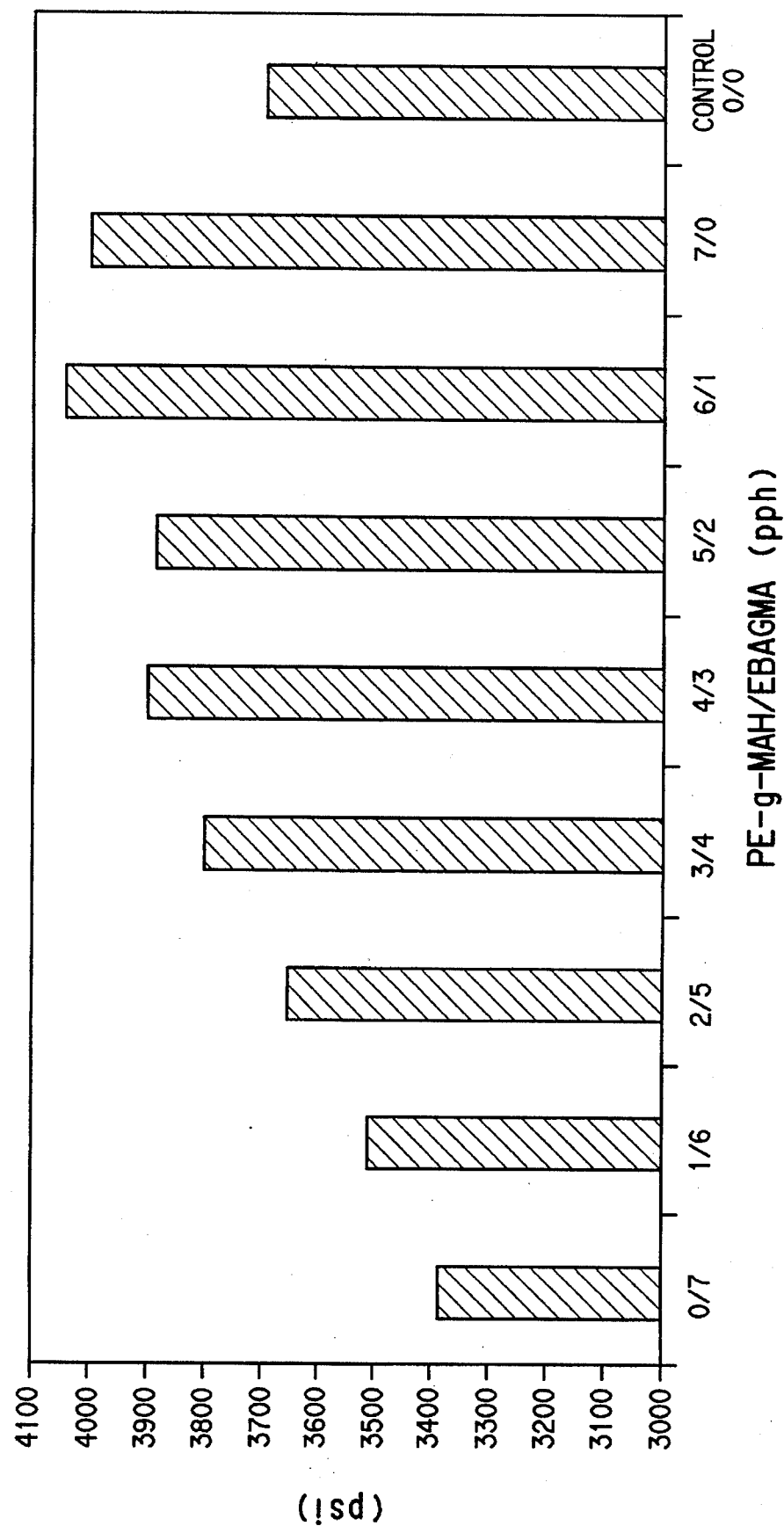
FIG. 4 is a chart showing Ultimate Tensile Strength.

This invention relates to a two component compatibilizer having a polyolefin with a grafted monomer such as PE grafted with maleic anhydride (PE-g-MAH) and a terpolymer of ethylene such as ethylene (E), n-Butyl Acrylate (nBA) and glycidyl methacrylate (GMA) namely (EnBAGMA) which particularly improves the mechanical properties of blends of polyolefins and polyesters, such as, for example, PE and PET.

The term blends of "polyolefins" as used herein generally relates to homopolymer of of ethylene, homopolymer of propylene, copolymer of ethylene and propylene, copolymers of ethylene with at least a $C_3$—$C_{10}$ hydrocarbon alpha-olefin, vinyl acetate, alkyl acrylate or alkyl methacrylate.

Examples of the hydrocarbon alpha-olefins include butene-1, hexane-1 and octene- 1.

Examples of the alkyl groups of the (meth)acrylates include methyl, ethyl, propyl and butyl.

Particularly polyolefins of interest are polyethylene PE, and polypropylene PP.

The term "polyester" as used herein includes, in general, linear saturated condensation products of glycols and dicarboxylic acids, or reactive derivatives thereof. Preferably, they will comprise condensation products of aromatic dicarboxylic acids having 8 to 14 carbon atoms and at least one glycol selected from the group consisting of neopentyl glycol, cyclo-hexane dimethanol and aliphatic glycols of the formula $HO(CH_2)_nOH$ where n is an integer of 2 to 10. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms.

The most common polyester compositions are based on polyethylene terephthalate homopolymers, polybutylene terephthalate homopolymers, polyethylene terephthalate/polybutylene terephthalate co-polymers, polyethylene terephthalate/polybutylene terephthalate mixtures and mixtures thereof, although other polyesters can be used as well, alone, in combination with each other, or in combination with those polyesters listed above. Such other polyesters include copolyetheresters such as described in U.S. Pat. Nos. 3,651, 014; 3,763,109 and 3,766,146.

In particular the compatibilizer to be described herein consists of two components:
1. a grafted polyolefin with a grafting monomer as described below and available from DuPont Canada under the trademark "Fusabond";
2. an ethylene terpolymer as described below.

Grafted Polyolefin With Grafting Monomer

The "grafted polyolefin" may be formed from at least one of a homopolymer of ethylene, a homopolymer of propylene, copolymers of ethylene and propylene especially copolymers of propylene with minor amounts of ethylene as in impact and random copolymer polypropylene, terpolymers of ethylene, propylene and dienes e.g. so called EPDM, or a copolymer of ethylene with at least one of a $C_3$–$C_{10}$ hydrocarbon alpha-olefin, vinyl acetate, alkyl acrylate or alkyl methacrylate. Examples of the hydrocarbon alpha-olefins include butene-1, hexene-1 and octene-1. Examples of the alkyl groups of the (meth)acrylates include methyl, ethyl, propyl and butyl. The copolymers may include both linear low density polyethylene (LLDPE) and very low density polyethylene (VLDPE).

The grafting monomer is at least one monomer selected from ethylenically unsaturated carboxylic acids and ethylenically unsaturated carboxylic acid anhydrides, including, less preferably, derivatives of such acids, and mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride, and substituted maleic anhydride, e.g. dimethyl maleic anhydride or citraconic anhydride, nadic anhydride, nadic methyl anhydride, and tetrahydrophthalic anhydride, maleic anhydride being particularly preferred. Examples of the derivatives of the unsaturated acids are salts, amides, imides and esters e.g. mono- and disodium maleate, acrylamide, maleimide, glycidyl methacrylate and dimethyl fumarate. Techniques for the grating of such monomers onto the polyolefin are known e.g. as described in U.S. Pat. No. 4,612,155 of R. A. Zelonka and C. S. Wong, which issued Sep. 16, 1986, and in published European Patent Application Number 0,398, 604 of D. J. Mitchell, published May 23, 1990. The present invention will be particularly described herein with reference to maleic anhydride as the grafting monomer.

In particular the example herein shall be described with reference to polyethylene grafted maleic anhydride (PE-g-MAH) sold by DuPont Canada under the trademark "Fusabond".

Ethylene Terpolymer

The second component of the compatibilizer consists of an ethylene terpolymer under the formula E/X/Y where E is the radical formed from ethylene and comprises 40–90 weight percent of the ethylene copolymer, X is the radical formed from

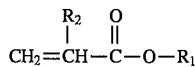

where $R_1$ is an alkyl group with 2–8 carbon atoms, preferably 4–6 carbon atoms, and most preferably 4 carbon atoms, and $R_2$ is H, $CH_3$ or $C_2H_5$, preferably H or $CH_3$, and most preferably H, and X comprises 10–40 weight percent, preferably 15–35 wt %, most preferably 20–35 wt % of the ethylene copolymer, and Y is selected from the group consisting of glycidyl methacrylate and glycidyl acrylate and Y comprises 0.5–20 weight percent, preferably 2.0–10 wt %, most preferably 3–8 wt % of the ethylene copolymer.

The example described herein shall be described in connection with the terpolymer consisting of:
1. ethylene (E)
2. X-n, butyl acrylate (nBA)
3. Y-glycidyl methacrylate (GMA)
i.e. EnBAGMA.

The two component compatibilizer referred to above has been found to be effective in improving the mechanical properties of generally available polyolefin such as PE, PP. In particular, the two component compatibilizer PE-g-MAH with EnBAGMA improves the strength characteristics of blends of PE/PET. Tests conducted show that PE-g-MAH used by itself with blends of PE/PET improves stiffness of the blends but not necessarily the toughness. The use of ethylene terpolymer by itself with blends of PE/PET improve the impact properties of the blend but not necessarily the stiffness. By utilizing the two component compatibilizer synergistic effects were observed by obtaining blends of PE/PET having a combination of toughness and stiffness.

EXAMPLE

Material

Regrind high density polyethylene RHDPE having a density of 0.96 gr/cc and melt index MI of 8.3 gr/10 min ASTM 1238 was dry blended with a post-consumer regrind PET having a melting point MP of 247° C. and inherent viscosity of 0.68 to 0.72. The weight ratio of PET/HDPE was varied but generally kept at 25/75 ratio by weight.

A two component compatibilizer system comprising of maleic anhydride grafted polyethylene (PE-g-MAH) with MI of 1.5 gr/10 min as is generally sold by DuPont under the trade-mark "Fusabond" and terpolymer or ethylene, n-butyl acrylate and glycidyl methacrylate (EnBAGMA) with MI of 12 gr/10 min and sold under DuPont's trade-mark of "Elvaloy" were utilized. The total weight percentage of compatibilizer was, for most parts, fixed at 7 parts per 100 of total weight while varying the ratio of Fusabond 226D and Elvaloy.

PROCESSING

Drying

The RPET bottle scarp flakes were dried at 80° C. overnight with nitrogen flow before processing to reduce the hydrolysis of PET during melt compounding.

Compounding

The feed stock RPET and RHDPE were dry blended at a desired ratio and fed toward the main hopper. The compatibilizer additive was added through a separate feeder for accurate metering into the main feed port. The compositions prepared are shown below.

| Run No. | RHDPE (%) | RPET (%) | Fus226 pph of RHDPE/RPET | EnBAGMA pph of HDPE/PET | MFI @ 260 C |
| --- | --- | --- | --- | --- | --- |
| 0 | 100 | | | | 19.2 |
| 1 | 75 | 25 | 0 | 7 | 1.49 |
| 2 | 75 | 25 | 1 | 6 | 2 |
| 3 | 75 | 25 | 2 | 5 | 3.57 |
| 4 | 75 | 25 | 3 | 4 | 3.63 |
| 5 | 75 | 25 | 4 | 3 | 3.78 |
| 6 | 75 | 25 | 5 | 2 | 7.37 |
| 7 | 75 | 25 | 6 | 1 | 10.7 |
| 8 | 75 | 25 | 7 | 0 | 17 |
| 9 | 75 | 25 | 0 | 0 | 30 |
| 10 | 65 | 35 | 5 | 2 | 3.37 |
| 11 | 75 | 25 | 2.5 | 1 | 11.6 |

The processing was carried out in a 25 mm Berstorff co-rotating intermeshing twin screw extruder. The extrusion temperature profile was set above the melting point of PET at 260° C. in the middle zone of the extruder. It was found that higher die pressures provided better dispersion of PET particles. Nitrogen flow at the hopper and vacuum before the die was applied during the processing. The melt strands were cooled in a water trough and pelletized. The melt strand stability and die swell were noted as different compositions were processed. The compounded pellets were subsequently dried at 80° C. and injection molded into ASTM test bars.

Testing

A number of different techniques were employed to access the effectiveness of the compatibilizer system used, namely:
1. optical and scanning electron Microscopy (SEM) were used to determine the morphology of the blend.
2. mechanical properties of the injection molded parts, such as:
   Tensile Strength and Elongation (2"/Min) in accordance with ASTM D-638 method.
3. Notched and Unnotched Izod impact strength at room temperature in accordance with ASTM D-256 method,
4. Flexural Modulus and Strength (0.05"/min) in accordance with ASTM D-790 method, The results for the various runs were compared with virgin HDPE sold under the trademark "Sclair 2908" as well as 100% reclaim HDPE and are summarized in FIGS. 1, 2, 3, and 4.

Results

It was observed that samples containing no compatibilizing agent were very hard to process (run #9) and frequent breaks in an extrudate of the material were encountered due to poor strand melt strength.

As seen from the Figures the samples containing only PE-g-MAH (run #8) show high flexural modulus and tensile strength, but the impact strength is poor. Samples containing only the ethylene terpolymer (run #1), on the other hand, indicate increases in impact strength, but both flexural modulus and tensile strength decrease noticeably.

As can be seen from the example herein good mechanical strength was observed by utilizing a composition compatibilizer in the ratio of approximately 5/2% by weight of Fusabond 226D/Elvaloy added to the blend of RHDPE/PET. In particular notched Izod impact strength at 3.59 ft-lb/in was achieved versus uncompatibilized composition with impact strength of only 0.27 ft-lb/in. Elongation at break also agree with the impact strength that is showing 5/2% weight ratio results in maximum elongation at break of approximately 120%, while sample stiffness which is reflected by flexural modulus measurements reveal that the increase in impact and elongation at break did not however cause this property to decrease. Moreover, the composition at the same time had higher flexural modulus than Sclair 908 and 100% recycled HDPE.

Figure 5A:
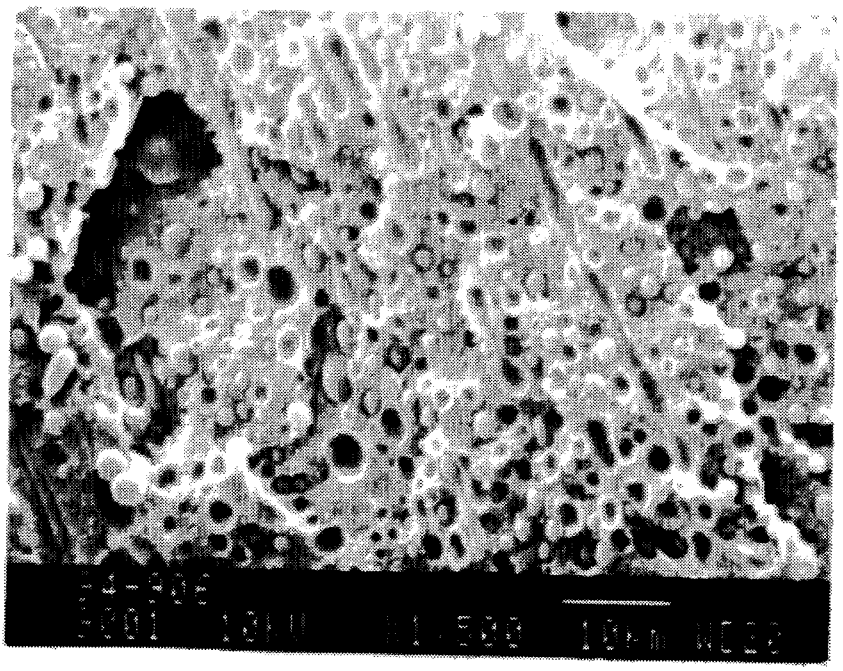
FIG. 5($a$) and ($b$) are pictures showing the morphology of the blends.

FIG. 5(a) depicts the morphology of control sample containing no compatibilizer (sample #9). RPET particles appear as spherical domains with 2-3 micron diameter. There is no indication of interaction between these particles and RHDPE matrix as expected for non-compatibilized systems.

Figure 5B:
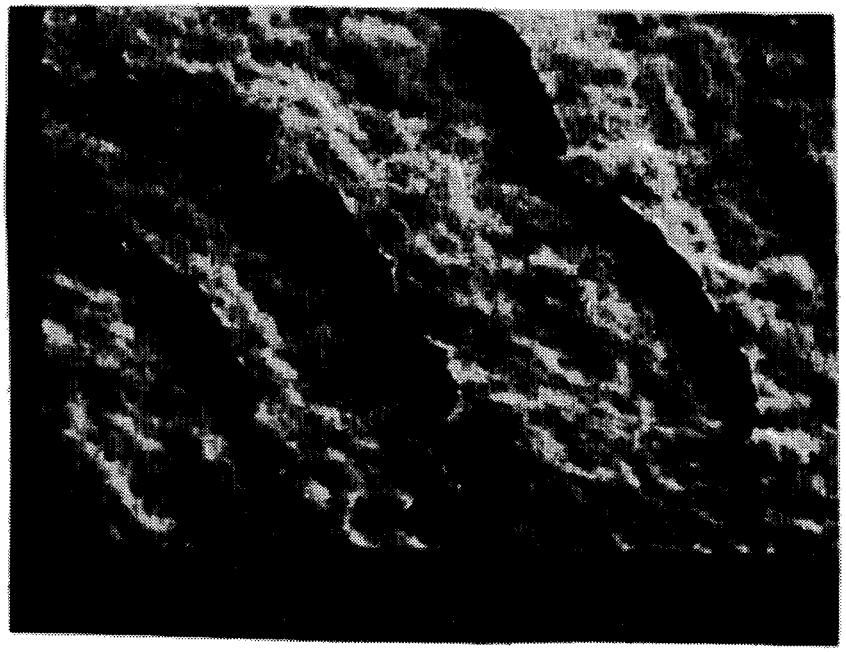

FIG. 5(b), on the other hand, shows sample #6 containing 5/2 pph of Fusabond 226D/Elvaloy has a uniform and homogenous morphology. RPET particle size has decreased to submicron level. The reduction in particle size is a result of lowering of interfacial tension between phases and indicates the effectiveness of the compatibilizer used.

The composition disclosed herein may be utilized for the production of injection molded articles, such as pallets or the like.

Moreover, the blend ratio of PE to PET can vary between 2 to 98 percent and 98 to 2 percent by weight although the example particularized herein relates to a 75 to 25 percent ratio of PET to PE.

Although the preferred embodiment as well as the operation and the use have been specifically described in relation to the drawings, it should be understood that variations in the preferred embodiments could be achieved by a person skilled in the trade without departing from the spirit of the invention as claimed herein.

The embodiments of the invention in which an exclusive property or privilege is claimed are defined as follows:

1. A process for blending
   (A) polyolefins selected from the group consisting of homopolymer of ethylene, and copolymer of ethylene with at least one monomer selected from the group consisting of butene-1, hexene-1, octene-1, vinyl acetate, alkyl acrylate and alkyl methacrylate, with
   (B) polyesters consisting essentially of a linear saturated condensation product of at least one glycol selected from the group consisting of neopentyl glycol, cyclohexane dimethanol and aliphatic glycols of the formula $HO(CH_2)_nOH$ where n is an integer of 2 to 10 and at least one aromatic dicarboxylic acid having 8 to 14 carbon atoms, or reactive derivatives thereof, comprising:
   melt blending 2 to 98 percent by weight of (A) the polyolefins with 98 to 2 weight percent of (B) the polyesters, based on the total weight of (A) and (B), with from about 2 to 35 parts by weight based on one hundred parts of the combined weight of (A) and (B) of a compatibilizer composition, the compatibilizer composition comprising (C) a grafted polymer being selected from the group consisting of at least one of homopolymer of ethylene and copolymers of ethylene with at least one monomer selected from the group consisting of butene-1, hexene-1, and octene-1, vinyl acetate, alkyl acrylate or alkyl methacrylate that has been grafted with at least one monomer selected from ethylenically unsaturated dicarboxylic acids and anhydrides thereof, and derivatives thereof selected from the group consisting of salts, amides, imides and esters; and (D) an ethylene terpolymer of the formula:

E/X/Y where

E is the radical formed from ethylene and makes up 40–90 weight percent of the ethylene copolymer, X is a radical formed from

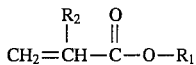

where $R_1$ is alkyl of 2–8 carbon atoms and $R_2$ is H, $CH_3$ or $C_2H_5$, and X makes up 10–40 weight percent of the ethylene copolymer, and Y is selected from the group consisting of glycidyl methacrylate and glycidyl acrylate, and Y makes up 0.5–20 weight percent of the ethylene copolymer.

2. The process of claim 1, wherein the polyolefin (A) is selected from ethylene homopolymers or copolymers of ethylene with at least one monomer selected from the group consisting of butene-1, hexene-1, and octene-1 and the polyester (B) is PET.

3. The process of claim 2 wherein the grafted polymer (C) is PE-g-MAH and the ethylene terpolymer (D) is EnBAGMA.

4. The process of claim 3 wherein blending is carded out in an extruder at a temperature of about 260° C.

5. The process of claim 4 wherein the polyolefin (A) comprises reground high density polyethylene having a density of approximately 0.96 gr/cc and melt index of approximately 8.3 gr/10 min.

6. The process of claim 5 wherein the PET (B) comprises reground PET having a melting point of about 247° C. and inherent viscosity of 0.68 to 0.72.

7. The process of claim 2 wherein the PE (A) is about 75 weight percent and the PET (B) is about 25 weight percent, based on the total weight of (A) and (B).

8. The process of claim 1 wherein the compatibilizer composition is about 7 parts by weight based on one hundred pans of the combined weight of (A) and (B).

9. The process of claim 3 wherein the PE-g-MAH (C) is about 5 parts by weight based on one hundred parts of the combined weight of (A) and (13) and EnBAGMA is about 2 parts by weight based on one hundred parts of the combined weight of (A) and (B).

* * * * *